United States Patent Office 3,236,806 Patented Feb. 22, 1966

3,236,806
PROCESS FOR TREATING SILICONE
ELASTOMERS
Milton L. Dunham, Jr., Tonawanda, N.Y., assignor to Union Carbide Corporation, a corporation of New York
No Drawing. Filed Apr. 20, 1961, Ser. No. 104,239
21 Claims. (Cl. 260—46.5)

This is a continuation-in-part of application Serial No. 575,366, filed April 2, 1956, now abandoned.

This invention relates to a process for curing silicone gum compounds. The invention provides an improved method of preparing silicone elastomers and easily curable silicone gum compounds.

Conventionally silicone gum compounds are converted into elastomers by means of curing agents. These agents are blended with the gum compounds which are then heated or otherwise treated to effect the desired curing. The properties of the elastomer are determined to an extent by the composition of the curing agent employed, the composition of the gum, the fillers used, and the conditions under which the gum is cured. Differences in the curing of gums may be attributable to the presence or absence of unsaturated hydrocarbon groupings in the gums. It has been found, for example, that with silicone gum compounds containing only saturated hydrocarbon groupings one curing agent is preferred, but when unsaturated hydrocarbon groupings are present in the gum, a curing agent which reacts selectively with the unsaturated organic groups can be used to advantage.

In the curing of any gum compound the retention of the curing agent in the gum compound until the curing reaction has been completed and the uniform distribution of the curing agent through the compound are problems which may be overcome. These problems are particularly troublesome in the case of certain volatile selective curing agents used in the curing of silicone gum compounds containing unsaturated hydrocarbon groups. The selective curing agents, for example peroxide curing agents described in more detail below, react preferentially with the unsaturated groups.

In commercial practice, catalyzed silicone gum compounds are often stored for long periods of time before use. During such storage, volatile peroxides tend to evaporate from the gum and often reach such a low concentration to the gum that satisfactory cures cannot be obtained. Another cause of difficulty with volatile peroxides occurs when silicone gum compounds containing such peroxides are milled. Very often appreciable quantities of peroxide vapors accumulate over the mill and subject personnel and equipment to the hazard of flash fires which any spark or static discharge might set off.

During curing operations the volatility of the peroxide is of course not significant for mold curing operations where the system is contained. However, in the case of open hot air curing or steam curing, as is commonly done commercially for large or irregularly-shaped objects or extrusions, then the volatility of the peroxide again makes curing impossible in many cases.

It is the principal object of the present invention to provide a process for the curing of silicone gum compounds with volatile curing agents.

A further object of the invention is to provide a process for curing silicone gum compounds wherein selected organic groups are cross-linked.

Still a further object of the invention is to provide a process for preparing curable silicone gum compounds which may be held or stored for a time prior to their curing without a significant change in properties.

Another object of the invention is to provide a process for preparing curable silicone gum compounds whereby the loss of the curing agent during compounding and the changes in the properties of the gum compound are not significant.

Another object of the invention is to provide a process for curing silicone gum compounds with volatile curing agents in which the danger of fire caused by the ignition of the curing agents is minimized.

The objects of the invention are accomplished by introducing into the silicone gum compound a quantity of a zeolitic molecular sieve containing a volatile curing agent. The curing agent is strongly adsorbed by the zeolitic molecular sieve and retained by it during compounding. So strongly is the curing agent adsorbed that, as will be demonstrated below, the loss of the curing agent and any premature reaction between the curing agent and gum compound at room temperature are of no practical importance after weeks of storage. The curing agent is released from the zeolitic molecular sieve by heating the sieve to curing temperatures.

Zeolitic molecular sieves both natural and synthetic, are metal-alumino-silicates. The crystalline structure of these materials is such that a relatively large sorption area is present inside each crystal. Access to this area is by way of openings or pores in the crystal. Molecules are selectively adsorbed by molecular sieves on the basis of size and polarity among other things. Once adsorbed the adsorbed molecules are strongly held by the zeolitic molecular sieves.

To facilitate an understanding of the terms used in the examples and claims appearing below, the zeolitic molecular sieve used in the preferred practice of the process of the invention will be described in some detail. For convenience the preferred synthetic molecular sieve used in the process of the invention has been designated "zeolite X" and is described, together with a process for making it, in detail in United States Patent 2,882,244.

The general formula for zeolite X, expressed in terms of mol fractions of oxides, is as follows:

$$0.9 \pm 0.2 M_{2/n}O : Al_2O_3 : 2.5 \pm 0.5 SiO_2 : 0 \text{ to } 8 H_2O \quad (1)$$

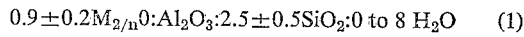

In the formula M represents a metal and $n$ its valence. The zeolite is activated or made capable of adsorbing certain molecules by the removal of water from the crystal as by heating. Thus the actual number of mols of water present in the crystal will depend upon the degree of dehydration or activation of the crystal.

The metal represented in the formula above by the letter M can be changed by conventional ion exchange techniques. The sodium form of the zeolite, designated sodium zeolite X, is the most convenient to manufacture. For this reason the other forms of zeolite X are usually obtained by the modification of sodium zeolite X.

A typical formula for sodium zeolite X is $$0.9Na_2O : Al_2O_3 : 2.5SiO_2 : 6.1H_2O$$

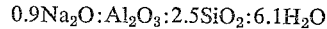

After activation by heating at least some of the water would be removed from the zeolite X and it then would be ready for use in the process of the invention.

The major lines in the X-ray diffraction pattern of zeolite X are set forth in Table A below:

TABLE A.—$d$ VALUE OF REFLECTION IN A 14.42±0.2
8.82±0.1
4.41±0.05
3.80±0.05
3.33±0.05
2.88±0.05
2.79±0.05
2.66±0.05

In obtaining the X-ray diffraction powder patterns, standard techniques were employed. The radiation was the K doublet of copper, and a Geiger counter spectrometer with a strip chart pen recorder was used. The peak heights, I, and the positions as a function of 2θ, where θ is the Bragg angle, were read from the spectrometer chart. From these, d (obs), the interplanar spacing in A., corresponding to the recorded lines was calculated. The X-ray patterns indicate a curic unit cell of dimensions between 24.5 A. and 25.5 A.

To make sodium zeolite X reactants are mixed in aqueous solution and held at about 100° C. until the crystals of zeolite X are formed. Preferably the reactants should be such that in the solution the following ratios prevail:

$SiO_2/Al_2O_3$ ------------------------------- 3–5
$Na_2O/SiO_2$ -------------------------------- 1.2–1.5
$H_2O/Na_2O$ -------------------------------- 35–60

The manner in which zeolite X might be obtained is illustrated by the following: 10 grams of $NaAlO_2$, 32 grams of an aqueous solution containing by weight about 20% $Na_2O$ and 32% $SiO_2$, 5.5 grams NaOH and 135 cc. $H_2O$ were mixed and held in an autoclave for 47 hours at about 100° C. Crystalline zeolite X was recovered by filtering and reacted materials and washed with water until the pH of the effluent wash water was between 9 and 12. The crystals were dried after which they were ready for use in the process of the invention.

Illustrative of another zeolitic molecular sieve that is useful in this invention is the zeolitic molecular sieve that is known as zeolite L and that can be represented by the average formula:

$$1.0 \pm 0.1 M'_{2/m}O : Al_2O_3 : 6.4 \pm 0.5 SiO_2 : Y'H_2O \quad (2)$$

wherein M' is an exchangeable cation, m is the valence of M' and Y' has a value from 0 to about 7. The exchangeable cations (M') that can be present in zeolite L include monovalent, divalent and trivalent metal ions, particularly those of Groups I, II and III of the Periodic Table, as set forth in Webster's New Collegiate Dictionary, 1956 edition, page 626. Among such cations are barium, calcium, cerium, lithium, magnesium, potassium, sodium, strontium, zinc ions, and the like. Preferably, the exchangeable cation is potassium. Zeolite L and a process for its production are disclosed in U.S. patent application 711,565, filed January 28, 1958, now abandoned.

The major lines in the X-ray diffraction pattern of zeolite L are set forth in Table B below:

TABLE B 16.1±0.3
7.5±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.10±0.01

Still another illustration of the synthetic zeolitic molecular sieves that are useful in this invention is the zeolitic molecular sieve that is known as zeolite Y and that can be represented by the average formula:

$$0.9 \pm 0.2\ Na_2O : Al_2O_3 : G\ SiO_2 : Y^3H_2O \quad (3)$$

wherein G has a value from greater than 3 and up to about y and $Y^3$ has a value from 0 to about 9. Zeolite Y and processes for its production are disclosed in U.S. Patent application Serial Nos. 728,057, filed April 14, 1958, now abandoned, and 862,062, filed December 28, 1959, now abandoned.

Zeolite Y has a characteristic X-ray powder diffraction pattern which can be employed to identify zeolite Y. The X-ray powder diffraction data are shown in Table C. The values for the interplanar spacing d, are expressed in angstrom units. The relative intensity of the lines of the X-ray powder diffraction pattern are expressed as VS, very strong; S, strong; M, medium; W, weak; and VW, very weak.

TABLE C

| hkl* | $h^2+k^2+l^2$ | d in A. | Intensity |
|---|---|---|---|
| 111 | 3 | 14.3 –14.4 | VS |
| 220 | 8 | 8.73– 8.80 | M |
| 311 | 11 | 7.45– 7.50 | M |
| 331 | 19 | 5.67– 5.71 | S |
| 333, 511 | 27 | 4.75– 4.79 | M |
| 440 | 32 | 4.37– 4.46 | M |
| 620 | 40 | 3.90– 3.93 | W |
| 533 | 43 | 3.77– 3.79 | S |
| 444 | 48 | 3.57– 3.59 | VW |
| 551, 711 | 51 | 3.46– 3.48 | VW |
| 642 | 56 | 3.30– 3.33 | S |
| 553, 731 | 59 | 3.22– 3.24 | W |
| 733 | 67 | 3.02– 3.04 | M |
| 660, 822 | 72 | 2.90– 2.93 | M |
| 555, 751 | 75 | 2.85– 2.87 | S |
| 840 | 80 | 2.76– 2.78 | M |
| 753, 911 | 83 | 2.71– 2.73 | W |
| 664 | 88 | 2.63– 2.65 | M |
| 931 | 91 | 2.59– 2.61 | M |
| 844 | 96 | 2.52– 2.54 | VW |
| 862; 10, 2, 0 | 104 | 2.42– 2.44 | VW |
| 666; 10, 2, 2 | 108 | 2.38– 2.39 | M |
| 775; 11, 1, 1 | 123 | 2.22– 2.24 | VW |
| 880 | 128 | 2.18– 2.20 | W |
| 955; 971; 11, 3, 1 | 131 | 2.16– 2.18 | VW |
| 973; 11, 3, 3 | 139 | 2.10– 2.11 | W |
| 884; 12, 0, 0 | 144 | 2.06– 2.07 | VW |
| 886; 10, 8, 0; 12, 4, 2 | 164 | 1.93– 1.94 | VW |
| 10, 8, 2 | 168 | 1.91– 1.92 | VW |
| 995; 13, 3, 3 | 187 | 1.81– 1.82 | VW |
| 11, 7, 5; 13, 5, 1 | 195 | 1.77– 1.78 | VW |
| 10, 8, 6; 10, 10, 0; 14, 2, 0 | 200 | 1.75– 1.76 | W |
| 997; 11, 9, 3 | 211 | 1.70– 1.71 | W |

*h, k and l are the miller indicies.

Illustrative of the naturally occurring zeolitic molecular sieves that are useful in this invention is the zeolitic molecular sieve that is known as faujasite and that can be represented by the average formula:

$$1 \pm 0.1\ M_{2/p}^3O : 1\ Al_2O_3 : 4.75 \pm 0.25\ SiO_2 : Y^4H_2O \quad (4)$$

wherein $M^3$ is calcium or sodium, p is the valence of $M^3$ and $Y^4$ has a value from 0 to about 8.

The zeolitic molecular sieves that are used in this invention are activated prior to absorbtion of the peroxide curing agent by heating the sieve. Apparently, heating the sieves effects a release of water molecules that is contained in the cavities of the sieve. The heating and the resulting loss of water does not desrtoy the crystalline structure of the sieve. The activation can be conducted, in the usual case, by heating the sieve at a temperature from about 250° C. to about 600° C.

It was found that the molecular dimensions of the curing agents that are useful in this invention are such that the curing agent can pass through the pores and enter the cavities of zeolites L, X, Y and faujasite. In this connection it has been found that the zeolitic molecular sieves useful in the practice of this invention are those which have pores capable of accepting aromatic compounds such as benzene (i.e., pore sizes of at least 6.6 Angstroms). Synthetic zeolite L, synthetic zeolite X, synthetic zeolite Y and naturally occurring faujasite are among the zeolitic molecular sieves which are able to accept and retain aromatic compounds such as benzene and which have a pore size of at least 6.6 Angstroms.

The zeolitic molecular sieves whose pores are too small to admit the curing agents that are employed in this invention are not particularly useful in the present invention. Such zeolitic molecular sieves usually exhibit a relatively lower order of retentive power for the curing agents used in this invention that is comparable to the relatively low retentive power of silica gel and carbon black for these curing agents. The retentive power of silica gel and carbon black for adsorbates is largely due to adsorption of the adsorbate on the outer surface of these materials.

The silicone gums to which the process of the invention may be advantageously applied are substituted siloxanes. Particularly good results have been obtained with silicone gums having at least some unsaturated hydrocarbon groups of one or more types. In the preferred embodiments of the invention described below a vinyl-substituted methyl silicone containing small amounts, i.e., less than one percent by weight, of vinyl groups was used. Other silicone gums containing phenyl, ethyl or cyclohexenyl groups or combinations of these groups are respresentative of the materials with which the process of the invention has proven satisfactory.

The gums used in this invention are diorganopolysiloxane copolymers that contain both of the siloxane groups represented by the formulae:

(5)

and

(6)

wherein R is a monovalent hydrocarbon group that is free of olefinic unsaturation and R' is a monovalent olefinically unstauration hydrocarbon group. The ratio of the organic groups (i.e., monovalent hydrocarbon groups that are free of olefinic unsaturation and monovalent olefinically unsaturated hydrocarbon groups) to silicon atoms in the starting organopolysiloxane gums is about 2.0 and is preferably from 1.95 to 2.05.

Illustrative of the monovalent olefinically unsaturated hydrocarbon groups that are represented by R' in Formula 5 are the alkenyl groups (for example, the vinyl and the allyl group); and the cycloalkenyl groups (for example, the cyclohexenyl group). The preferred monovalent olefinically unsaturated hydrocarbon group is the vinyl group.

Illustrative of the monovalent hydrocarbon groups that are free of olefinic unsaturation and that are represented by R in graphical Formulae 5 and 6 are the alkyl groups (for example, the methyl, ethyl, propyl and butyl groups); the aryl groups (for example, the phenyl group); the aralkyl groups (for example, the benzyl and the phenylethyl groups); and the cycloalkyl groups (for example, the cyclohexyl group).

Useful diorganopolysiloxane gums have viscosities and molecular weights that are not narrowly critical. Preferably the gums have viscosities from 500,000 centistrokes to 10,000,000 centistrokes and molecular weights from 100,000 to 1,500,000. More desirably, these gums have viscosities from 750,000 centistrokes to 4,000,000 centistrokes and molecular weights from 500,000 to 1,000,000.

Useful diorganopolysiloxane gums can contain siloxane groups that are represented by Formula 6 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, beta-phenylethyl(methyl)siloxy and diethylsiloxy groups.

Useful starting organopolysiloxane gums contain one or more types of siloxane groups represented by Formula 5 and one or more types of siloxane groups represented by Formula 6. By way of illustration, one useful gum is composed of ethylvinylsiloxy groups and dimethylsiloxy groups; a second useful gum is composed of methylvinylsiloxy groups, phenylvinylsiloxy groups and dimethylsiloxy groups; and a third useful gum is composed of methylvinylsiloxy groups, dimethylsiloxy groups and diphenyl siloxy groups.

Silicon-bonded monovalent olefinically unsaturated hydrocarbon groups (i.e., groups represented by R' in Formula 5) react to produce crosslinks between the molecules of the starting gum through the agency of alkyl peroxide curing agents. The relative amount of the siloxane groups represented by Formula 5 contained in the gum is that amount which provides the degree of crosslinking necessary to impart elastomeric properties to the cured product. The cured products produced from gums that contain an insufficient amount of groups represented by Formula 5 are soft and gummy rather than elastomeric. The cured products produced from gums that contain an excessive amount of groups represented by Formula 5 are hard and brittle rather than elastomeric. Generally, amounts of siloxane groups represented by Formula 5 from 0.05 part to 3.0 parts by weight per 100 parts by weight of the siloxane groups in the gum usually provide the degree of crosslinking necessary to produce an elastomeric product. Preferably, the starting gum contains from 0.1 part to 0.4 part by weight of siloxane groups represented by Formula 5 per 100 parts by weight of the siloxane groups in the gum. Conversely, the gum can contain from 97.0 parts to 99.95 parts by weight but preferably contains from 99.6 parts to 99.9 parts by weight of siloxane groups represented by Formula 6 per 100 parts by weight of the siloxane groups in the gum.

Starting organopolysiloxane gums that are useful in this invention can be produced from chlorosilanes or alkoxysilanes by known hydrolysis, condensation and equilibration processes. Due to the monoorganosilane impurities (e.g., methyltrichlorosilane) and triorganosilane impurities (e.g., trimethylchlorosilane) in the starting materials, such organopolysiloxane gums usually contain small amounts of monoorganosiloxy groups (e.g., monomethylsiloxy groups) and triorganosiloxy groups (e.g., trimethylsiloxy groups). Small amounts of the latter mentioned groups may be present by design as endblocking or chain terminating groups.

Useful starting organopolysiloxane gums can contain small amounts of organic end-blocking or chain terminating groups. By way of illustration, useful gums may contain small amounts of alkoxy end-blocked groups.

The curing agents that are useful in this invention are alkyl peroxides that are composed only of carbon, hydrogen and oxygen; that are free of organo-functional groups other than from 1 to 2 peroxide groups; and that contain from 4 to 20 carbon atoms per molecule. The polarity of these alkyl peroxides is determined largely by the sole organofunctional group therein (i.e., the peroxide group) and the molecular dimensions of these alkyl peroxides is determined largely by the total number of atoms in the molecule. By the phrase "alkyl peroxide" as used herein is meant a compound containing an alkyl group linked to one valence of a peroxide group (i.e., the —O—O— group). The alkyl group in the peroxide can contain an aryl substituent and, in that event, the peroxide can be more specifically termed an aralkyl peroxide (e.g., dicumyl peroxide). The other valence of the peroxide group can be linked to another alkyl group, to an aryl group or to a hydrogen atom.

Illustrative of the peroxide curing agents that can be employed in the process of the invention are the dialkyl peroxides. These peroxides may be represented by the formula:

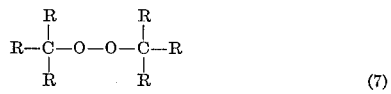

(7)

wherein R is a hydrocarbon group that is free of olefinic unsaturation as defined for Formula 5. Preferably R in Formula 7 is an alkyl group containing from 1 to 3 carbon atoms (i.e., the methyl, ethyl and propyl groups) or a phenyl group. The groups represented by R in Formula 7 may be the same or different. The preferred agent is di-tertiary-butyl peroxide while tertiary-butyl-triethyl-methyl peroxide; tertiary-butyl-tertiary-triptyl peroxide; tertiary-butyl-hydro peroxide; 2,5, dimethyl-2,5-di(tertiary-butyl-peroxy)hexane; and dicumyl peroxide are other materials with which satisfactory cures of silicone gum compounds can be obtained according to the teachings of the invention.

Although the advantageous results of this invention are most pronounced when the alkyl peroxide is a volatile liquid at room temperature, improved results are also obtained when the alkyl peroxide is a solid at room temperature. In the case of the latter peroxides, loss by volatilization at cure temperatures is minimized by the practice of the present invention.

The amount of the alkyl peroxide used as a curing agent in this invention is not narrowly critical. In practice the amount of the curing agent can vary from 0.05 part by weight to 10 parts by weight of the peroxide per 100 parts by weight of the diorganopolysiloxane gum. The preferred amount of the peroxide curing agent is from 0.2 part to 2.0 parts by weight per 100 parts by weight of the gum.

The curing agents used in this invention can be caused to be retained by zeolitic molecular sieves by various processes. By way of illustration, volatile liquid curing agents can be vaporized and the vapor allowed to come into contact with the zeolitic molecular sieve. Solid curing agents can be caused to sublime and the vapor allowed to come into contact with the zeolitic molecular sieve. The retention of solid curing agents by the zeolitic molecular sieve also can be brought about by a process that includes (a) forming a mixture of the curing agent, the zeolitic molecular sieve and a liquid organic compound (solvent) in which the curing agent is soluble, (b) agitating the mixture till the curing agent is adsorbed by the zeolite, (c) filtering the mixture to separate the zeolite from the solvent, (d) washing the zeolite to remove any externally absorbed curing agent and (e) removing any solvent from the zeolite (e.g., by vacuum stripping or by purging with an inert dry gas).

In the latter process for causing solid curing agents to be retained by the zeolitic molecular sieve, such hydrocarbon solvents as n-heptane, cyclohexane, and the like can be employed as the liquid organic compound in which the curing agent is soluble. The use of n-heptane is preferred. The amounts of the liquid organic compound used is not narrowly critical and may vary from 10 parts by weight to 1000 parts by weight of the liquid organic compound per part by weight of the curing agent; but it is preferred to employ from 75 parts by weight to 400 parts by weight of the liquid organic compound per part by weight of the curing agent. Other amounts of the liquid organic compound may be used without any corresponding desirable effect being produced.

The amount of curing agent retained by the zeolitic molecular sieve is not fixed by sharply defined limits, and can vary widely depending on such factors as the size of the cavities in the zeolitic molecular sieve, the dimensions of the molecules of the curing agent, whether or not the maximum amount of curing agent is retained by the zeolitic molecular sieve and the presence of other absorbates retained by the zeolitic molecular sieve. In practice it was found that amounts of the curing agent from 1 part to 25 parts by weight per 100 parts by weight of the zeolitic molecular sieve are useful but amounts of the curing agent from 10 parts by weight to 20 parts by weight per 100 parts by weight of the zeolitic molecular sieve are preferred.

The amounts of the zeolitic molecular sieve containing the curing agents mixed with the organopolysiloxane in producing the curable gum compounds of this invention is not narrowly critical and can vary widely depending largely on the amount of the zeolitic molecular sieve required to provide the amount of curing agent needed to cure the elastomer. In practice it was found that from 0.15 part to 10.0 parts by weight of the zeolitic molecular sieve per 100 parts by weight of the diorganopolysiloxane gum are useful but from 0.6 part to 10.0 parts by weight of the zeolitic molecular sieve per 100 parts by weight of the diorganopolysiloxane gum is preferred.

The volatility of the curing agents used in the process of the invention and the problems involved in storing gumstocks containing the curing agents were demonstrated by a series of experiments. To each of two batches of a dimethylsiloxane gum containing 0.35 weight percent of ethylvinylsiloxane one part by weight of di-tertiary-butyl peroxide was added. One batch containing silica particles as a filler was cured immediately by holding it at a temperature of 340° F. for 20 minutes. The cured material had a tensile strength of 1000 p.s.i. and other excellent properties. The second batch was stored at room temperature for two days in a thin sheet open to the atmosphere and subjected to the same curing conditions as was the first batch. The second batch did not cure. Similar results were observed with two batches of the same gumstock to which 1.29 parts by weight of tertiary-butyl triethylmethyl peroxide were added.

In the preparation of a curable silicone gum compound according to the process of the invention, a zeolitic molecular sieve containing the curing agent is provided. Preferably the curing agent is adsorbed in the gaseous phase. Examples I and II illustrate a satisfactory adsorption of a curing agent by zeolite X.

*Example I*

A beaker containing 16.93 grams of activated powdered zeolite X was placed in a desiccator containing a desiccant. Another beaker containing ditertiary-butyl peroxide was placed in the desiccator and the desiccator closed. After standing overnight (about 18 hours) the zeolite X was found to have adsorbed 1.31 grams of di-tertiary-butyl peroxide.

*Example II*

With equipment and in the manner described in Example I, 20.03 grams of activated powdered zeolite X were held for about three days. As a result 4.03 grams of di-tertiary-butyl peroxide were adsorbed by the zeolite.

The peroxide-containing zeolite X prepared in Examples I and II was used to cure an elastomer as described in Examples III and IV respectively.

*Example III*

A silicone elastomer compound was prepared by adding 52.5 grams of finely divided silica to 150 grams of a highly viscous polymer, essentially 99.65 weight-percent dimethylsiloxane and 0.35 weight-percent ethylvinylsiloxane, on a rubber compounding mill which had differential rolls. The zeolite X and its adsorbed di-tertiary-butyl peroxide, whose preparation is described in Example I, was added to the compound on the rubber compounding mill. The compound was milled about 10 minutes. Two slabs of the elastomer were cured in a standard four-cavity mold, having 6 in. x 6 in. x .075 in. cavities, under enough pressure to make the elastomer flow out and fill the cavities before the onset of the curing reaction. The elastomer was held in the mold for 20 minutes at 340° F. A good cure resulted.

*Example IV*

A silicone elastomer compound was prepared by adding 105 grams of finely divided silica to 300 grams of a highly viscous polymer, essentially 99.65 weight-percent dimethylsiloxane and 0.35 weight-percent ethylvinylsiloxane on a rubber compounding mill which had differential rolls. Eighteen grams of the zeolite X and adsorbed di-tertiary-butyl peroxide (equivalent to 3.01 grams di-tertiary-butyl peroxide) whose preparation is described in Example II were added to the compound on the rubber compounding mill. The compound was milled about 10 minutes. Two slabs of the elastomer were cured at 340° F. for 20 minutes in the standard four-cavity mold described in Example III under enough pressure to make the elastomer flow out and fill two of the cavities before the onset of the curing reaction. One of the slabs was tested ½ hour after removal from the mold, and the other slab was placed in a circulating air oven at 480° F. for 24 hours, after which it was also tested. The results of these tests are reported in Table D below.

The remainder of this compound was then sheeted at a 0.050-in. thickness and hung on a rack in the uncured state. It was fully exposed to the atmosphere in this manner for 48 hours, after which it was re-entered on the rubber compounding mill and then three slabs were cured at 340° F. for 20 minutes in the standard four-cavity mold under enough pressure to make and fill three of the cavities before the onset of the curing reaction. One of the slabs was tested ½ hour after removal from the mold and the other two slabs were placed in a circulating air oven at 480° F. for 24 hours after which they were also tested. The results of these tests are reported in Table D. From Table D it can be seen that the gumstock was successfully cured under conditions which, as reported above, in the absence of the adsorption of the peroxide by the zeolititic molecular sieve resulted in uncured gumstock. These results clearly demonstrate the effectiveness of the zeolitic molecular sieve in retaining the peroxide curing agent.

Slabs of the prepared compound were molded as described in Examples III and IV and subjected to a curing temperature of 340° F. for 20 minutes. The compound under these conditions was not cured.

The results in Examples III and IV together with the results of the treatment of a silicone elastomer with activated zeolite X in the absence of the curing agent, demonstrate that zeolite X is capable of adsorbing a curing agent and releasing it under curing conditions to cure the elastomer. The results further demonstrate that a molecular sieve is capable of retaining effective amounts of a curing agent during storage.

The procedure described in Examples I and II for the adsorption of a volatile curing agent by a molecular sieve is suitable for the preparation of small amounts of the treated sieve. Another procedure, more satisfactory for the preparation of larger quantities of the material, is described in Example V.

Example V 1349 grams of pelletized activated zeolite X were placed in a glass column which was 60 in. long and had a 2-in. inside diameter. 184 grams of di-tertiary-butyl peroxide were placed in a saturator and dry nitrogen was passed through the peroxide. The peroxide-saturated nitrogen was then passed through the packed column. This treatment was continued for about one week, with additions of di-tertiary-butyl peroxide to the saturator when needed. After this treatment, the zeolite had gained 240 grams in weight. This is approximately equivalent to 17.8 grams of di-tertiary-butyl peroxide per 100 grams of activated zeolite X.

In an effort to compare the effectiveness of a volatile

TABLE D

| Exposure of cmpd. to air (days) | Mold Cured Properties | | | | Oven Postcured* 24 Hr. at 480° F. | | | | | |
|---|---|---|---|---|---|---|---|---|---|---|
| | Tensile (Percent) | Elong. (Percent) | Hardness | Set (Percent) | Tensile (p.s.i.) | Elong. (Percent) | Hardness | Set (Percent) | Wt. Loss (Percent) | Set (Percent) |
| 0 | 845 | 280 | 61 | 5 | 700 | 140 | 77 | Nil | 8.7 | 23.6 |
| 2 | 955 | 320 | 60 | Nil | 660 | 120 | 75 | Nil | 5.8 | 17.3 |

*A widely used final curing step to obtain optimum properties.

In Table D and elsewhere in the specification where such tests are reported "Hardness" and "Compression Set" (Comp. Set) refers to the following standard tests and definitions:

*Hardness (ASTM–D676–49T).*—Degree of indentation produced by a plunger or indentor under a specific load. Measured with a Shore A Durometer. The values range from 0 to 2 maximum hardness of 100.

*Compression Set (ASTM–D395–52T).*—Degree of failure of a sample to return to its original size after removal of a deforming force. Compression set tests are run by compressing a 1.129 inch diameter x 0.500 inch high cylindrical specimen at a definite fixed deflection. (This description is of Method B which was used to obtain the results in Tables D, E, F, G and H.) After the specimen has been compressed, it may be subjected to an elevated temperature for a fixed time (22 hours at 350° F. in the tests reported in Tables D, E, F, G and H) then the load is released; after a 30 minute rest, the permanent change in the height of the specimen is measured and the percent set calculated. A small value is desirable. Compression set is expressed as percent of original deflection in this application.

To check the effect of zeolite X alone on silicone materials, a silicone elastomer compound was prepared by blending 150 grams of the viscous polymer used in Examples III and IV with 60 grams of finely divided silica on a rubber compounding mill. To the blended material were added 7.5 grams of powdered zeolite X which contained no curing agent or other adsorbed material.

curing agent adsorbed on a molecular sieve with that of the same curing agent as it is conventionally used, the series of tests described in Example VI and summarized in Table E were run.

Example VI

A silicone elastomer compound comprising a viscous polymer, essentially 99.65 weight-percent dimethyl-siloxane and 0.35 weight-percent ethylvinylsiloxane, and finely divided silica in the proportions by weight of 40 to 16 were mixed on a rubber compounding machine having differential rolls. After mixing, 210 grams of the silicone elastomer were milled on the compounding mill until the compound became plastic enough to band on the faster roll. To this compound 1.95 grams of the zeolite X containing di-tertiary-butyl peroxide prepared in Example V (equivalent to 0.2 part of the peroxide per 100 parts of the polymer) were added after which the milling continued for about ten minutes. Three slabs of the compound were cured in the standard four-cavity mold and under the conditions described in Example III. One of the slabs was tested about one-half of an hour after removal from the mold and the other two slabs were placed in a circulating air oven at 480° F. for 24 hours after which they were also tested. The same procedure was repeated with the peroxide-containing zeolite X in amounts of 0.98 grams, 3.9 grams, 5.85 grams and 7.8 grams (equivalent, respectively, to 0.1, 0.4, 0.6 and 0.8 part of peroxide per 100 parts of polymer). Similarly, quantities of the silicone compound were cured by the addition of di-tertiary-butyl peroxide in the absence of zeolite X and in amounts of 0.15 gram, 0.3 gram, 0.6 gram, 0.9 gram and 1.2 grams (equivalent, respectively, to 0.1, 0.2, 0.4, 0.6 and 0.8 part of peroxide per 100 parts of polymer). The results of the measurement of the physical properties of these materials are given in Table E.

stored, quantities of the silicone elastomer tested in Example VI were prepared. To one batch of the material di-tertiary-butyl peroxide was added while to other batches zeolite X containing di-tertiary-butyl peroxide was added. The impregnated zeolite was added in the manner described in Example VI and in amounts such that 0.8 part TABLE E
[Part I]

| Curing Agent Without Zeolite X, (Parts Per 100 parts Polymer) | Curing Agent in Zeolite X | | Mold Cured 20 min. at 340° F. | | | |
|---|---|---|---|---|---|---|
| | (Parts of Zeolite+ Curing Agent) per 100 parts Polymer | Parts of Curing Agent per 100 parts Polymer | Tensile (p.s.i.) | Elong. (percent) | Hardness (Shore A) | Set (percent) |
| 0.1 | --------- | --------- | 460 | 570 | 18 | Nil. |
| 0.2 | --------- | --------- | 1,040 | 330 | 35 | Nil. |
| 0.4 | --------- | --------- | 780 | 270 | 37 | Nil. |
| 0.6 | --------- | --------- | 860 | 250 | 40 | Nil. |
| 0.8 | --------- | --------- | 940 | 260 | 42 | Nil. |
| --------- | 0.65 | 0.1 | 950 | 270 | 43 | Nil. |
| --------- | 1.3 | 0.2 | 870 | 230 | 45 | Nil. |
| --------- | 2.6 | 0.4 | 830 | 240 | 44 | Nil. |
| --------- | 3.9 | 0.6 | 790 | 220 | 45 | Nil. |
| --------- | 5.2 | 0.8 | 1,040 | 200 | 47 | Nil. |

TABLE E
[Part II]

| Curing Agent Without Zeolite X, Parts per 100 parts Polymer | Curing Agent in Zeolite X | | Oven Postcured 24 hrs. at 480° F. | | | | | |
|---|---|---|---|---|---|---|---|---|
| | (Parts of Zeolite+ Curing Agent) per 100 parts Polymer | Parts of Curing Agent per 100 parts Polymer | Tensile (p.s.i.) | Elong. (percent) | Hardness (Shore A) | Set (percent) | Wt. Loss (percent) | Comp. Set (percent) |
| 0.1 | --------- | --------- | 560 | 400 | 33 | 5 | 6.3 | 26 |
| 0.2 | --------- | --------- | 760 | 260 | 45 | Nil | 8.1 | 16 |
| 0.4 | --------- | --------- | 790 | 210 | 49 | Nil | 8.4 | ---- |
| 0.6 | --------- | --------- | 750 | 170 | 54 | Nil | 7.9 | ---- |
| 0.8 | --------- | --------- | 800 | 190 | 53 | Nil | 7.4 | 16 |
| --------- | 0.65 | 0.1 | 1,000 | 230 | 56 | Nil | ----- | 10 |
| --------- | 1.3 | 0.2 | 690 | 150 | 54 | Nil | 10.5 | 14 |
| --------- | 2.6 | 0.4 | 730 | 150 | 51 | Nil | 8.5 | ---- |
| --------- | 3.9 | 0.6 | 700 | 160 | 51 | Nil | 8.2 | ---- |
| --------- | 5.2 | 0.8 | 670 | 140 | 53 | Nil | 7.7 | 12 |

From Table E it can be seen that the curing of a silicone compound with a curing agent retained by a molecular sieve is at least as efficient as the curing of the same material with the same curing agent using conventional techniques. In some instances the use of the molecular sieve according to the process of the invention resulted in cured materials superior to those obtained by the prior art. Several factors would seem to have a tendency to bring about these superior results. Among these factors are the following: The molecular sieve reduces the amount of curing agent lost during milling; and a relatively even distribution of the curing agent in the silicone compound is obtained when the agent is retained by the molecular sieve.

To test and compare the behavior of materials prepared according to the process of the invention when of the catalyst per 100 parts of polymer were present. Sheets of 100 mils thick were prepared from each batch and stored. After the sheets containing the adsorbed peroxide has been exposed to air for a time at room temperature, the batches were cured. Some samples were tested immediately after curing while others were given a postcure treatment consisting of being heated in warm air at 480° F. for 24 hours. After curing, and in some instances the further treatment described, the silicone compounds are tested. The results of these tests are set forth in Table F. The batch of the compound which did not contain the treated zeolite was stored for seven days with the other batches. At that time efforts to cure the zeolite-free material were unsuccessful indicating a deficiency of the curing compound.

TABLE F

| | Mold Cured 20 min. at 340° F. | | | | Postcured 24 hours at 480° F. | | | | | |
|---|---|---|---|---|---|---|---|---|---|---|
| Aged (days) | Tensile (p.s.i.) | Elong. (percent) | Hardness (Shore A) | Set (percent) | Tensile (p.s.i.) | Elong. (percent) | Hardness (Shore A) | Set (percent) | Loss (percent) | Set (percent) |
| 0 | 1,040 | 200 | 47 | Nil | 670 | 140 | 53 | Nil | 7.7 | 12 |
| 7 | 960 | 280 | 44 | Nil | 760 | 180 | 47 | Nil | 6.4 | 12 |
| 14 | 900 | 440 | 32 | Nil | 430 | 170 | 44 | 5 | 9.6 | 23 |
| 21 | 1,020 | 360 | 36 | Nil | 580 | 190 | 42 | Nil | 6.9 | 17 |
| 28 | Very slight cure if any. | | | | | | | | | |
| 35 | Very slight cure if any. | | | | | | | | | |

Other storage tests showed that there was no appreciable change in the elastomer compound when it was stored for thirty-five days in the absence of a curing agent whether activated zeolite X were present in the elastomer or not. An elastomer to which the molecular sieve and curing agent were added without first impregnating the molecular sieve with the curing agent exhibited some improvement in storage properties as compared to an elastomer containing some curing agent but no molecular sieve. Adsorption of the curing agent while the molecular sieve and curing agent are being blended with the elastomer would not seem to result in the most satisfactory retention of the curing agent. For this reason the procedures followed in Examples V and VI are recommended. The storage tests demonstrate the stability of an elastomer-curing agent system in which the curing agent is adsorbed by a molecular sieve. The severe conditions used in the test, e.g., the storage of the elastomer in sheets of 100 mils thickness, make it apparent that an elastomer prepared according to the process of the invention can be held for prolonged periods of time under normal conditions without serious detriment to the elastomer.

The actual physical properties of materials cured according to the invention will of course depend upon the composition of the silicone elastomer treated. An example of the manner in which the composition of the gumstock will affect the properties of the cured material can be seen in Table G. The data in the table was obtained with two silicone elastomers as follows: The data in column 1 is for a dimethylsiloxane containing 0.35 weight-percent ethylvinylsiloxane and that in column 2 for a dimethylsiloxane containing 0.25 weight-percent ethylvinylsiloxane. In each instance 100 parts of the polymer, 40 parts of the finely divided silica and 5.2 parts zeolite X impregnated with di-tertiary-butyl peroxide (equivalent of 0.8 part of the peroxide) were blended on a compounding mill and molded prior to the indicated tests.

TABLE G

| | 1 | 2 |
|---|---|---|
| Mold Cured (20 min. at 340° F.): | | |
| Tensile (p.s.i.) | 900 | 830 |
| Elongation (percent) | 210 | 250 |
| Hardness (Shore A) | 47 | 44 |
| Set (percent) | Nil | Nil |
| Oven Postcured (Held after curing for 24 hrs. at 480° F.): | | |
| Tensile (p.s.i.) | 740 | 870 |
| Elongation (percent) | 160 | 200 |
| Hardness (Shore A) | 54 | 53 |
| Set (percent) | Nil | Nil |
| Wt. Loss (percent) | 8.2 | 7.6 |
| Compression Set (percent) | 12 | 9 |

Besides the zeolite X described above and used in the examples of the process of the invention, other zeolitic molecular sieves, both natural and synthetic can be used as carriers of curing agents for silicone elastomers. Faujasite, a natural zeolitic molecular sieve, is an example of a carrier that can be used with the peroxide curing agent described in the examples. It will of course be apparent to those skilled in the art that best results will be obtained if the molecular sieve containing the curing agent is distributed uniformly through the gum prior to the release of the curing agent. Fillers customarily employed with silicone gums can be used with materials cured according to the invention. Both carbon and silica have been used satisfactorily as fillers with silicone gum compounds treated as described herein.

A technique for curing elastomers which differs in detail from that described above was employed on a silicone gum compound with the results tabulated in Table F. A quantity of zeolite X was impregnated with di-tertiary-butyl peroxide in a manner similar to that already disclosed. The zeolite X contained 14.5% by weight di-tertiary-butyl peroxide. A paste of 100 grams of a vinyl-containing dimethyl silicone polymer and 52.5 grams of the zeolite X was prepared by milling the two materials for ten minutes. The gumstock to be cured had a composition as follows: 87.85 weight percent dimethylsiloxane, 12.0 weight percent diphenylsiloxane and 0.15 weight percent ethylvinylsiloxane. This phenyl-containing gum and a finely divided silica filler in the ratio of about 40 parts gum to 20 parts filler were mixed on a rubber compounding mill until the compound became plastic enough to bond to the faster roll. A quantity of the paste and 229 grams of the phenyl-containing gum were blended in proportion such that there were 0.5 part of di-tertiary-butyl peroxide per 100 parts of silicone polymer. After blending the materials, two slabs were cured in the slab mold as described in Example III. The properties of one slab as it was removed from the mold and the other slab which was subjected to a postcuring treatment are reported in Table H.

TABLE H

Mold cured (20 min. at 340° F.):
    Tensile (p.s.i.) _____ 880
    Elongation (percent) _____ 370
    Hardness (Shore A) _____ 41
    Set (percent) _____ nil
Oven postcured (held after curing for 24 hrs. at 480° F.):
    Tensile (p.s.i.) _____ 790
    Elongation (percent) _____ 230
    Hardness (Shore A) _____ 60
    Set (percent) _____ nil

*Example VII*

Two runs were made to cure silicone gum compounds using two different peroxide curing agents adsorbed on zeolite X.

The various materials employed in these runs are defined as follows:

*Silicone gum.*—This was a siloxane composed of 99.7 wt.-percent dimethylsiloxane groups and 0.30 wt.-percent methylvinylsiloxane groups.

*Silica filler I.*—This silica filler is commercially available under the trade name "HiSil X-303." It is a precipitated silica having an average particle size of 170 Angstroms and a surface area of about 150 square meters per gram.

*Peroxide-Zeolite I.*—This dicumyl peroxide which has the formula: $C_6H_5C(CH_3)_2$—O—O—$(CH_3)_2CC_6H_5$ absorbed on zeolite X (20 wt.-percent peroxide). The peroxide was caused to be retained by the zeolite by the following process: Eighty g. of zeolite X activated powder were placed in a one-quart porcelain ball mill about ½ filled with porcelain balls. Twenty g. of dicumyl peroxide were then added. The ball mill was sealed and rotated on a jar mill for a minimum of two hours. The resulting product was a free flowing white powder containing 20 wt.-percent dicumyl peroxide.

*Peroxide-Zeolite II.*—This is 2,5-dimethyl 2,5-di-(tertiary-butyl-peroxy)hexane which has the formula:

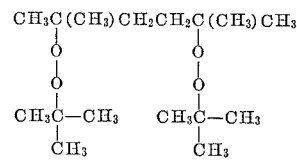

adsorbed on zeolite X (15 wt.-percent peroxide). The peroxide can be adsorbed by this zeolite by placing both materials in a desiccator and sealing the desiccator. The peroxide volatilizes and the vapor is adsorbed by the zeolite.

The amounts of components shown below were blended together and the gum compounds so formed were cured in a mold for 20 minutes at 340° F. The properties of the mold cured elastomers so produced were measured and then the elastomers were postcured for 24 hours at 480° F. Finally the properties of the postcured elastomer were measured. These runs are tabulated in Table I.

TABLE I

|  | Amount (parts by weight) | |
|---|---|---|
|  | Run 1 | Run 2 |
| Components of Gum Compound: |  |  |
| Silicone Gum | 100 | 100 |
| Silica Filler I | 45 | 45 |
| Peroxide—Zeolite I | 5.85 |  |
| Peroxide—Zeolite II |  | 2.70 |
| Properties After Mold Cure: |  |  |
| Durometer Hardness (Shore A) | 52 | 48 |
| Tensile Strength (p.s.i.) | 940 | 760 |
| Elongation (Percent) | 230 | 220 |
| Set at Break (Percent) |  | 2 |
| Properties After Postcure: |  |  |
| Durometer Hardness (Shore A) | 48 | 49 |
| Tensile Strength (p.s.i.) | 780 | 840 |
| Elongation (Percent) | 190 | 220 |
| Set at Break (Percent) |  | nil |
| Compression Set After 22 hrs. at 350° C. (Percent) | 8.7 | 4.4 |

The zeolite X employed in all of the above examples was the sodium form of the zeolite (i.e. the zeolite represented by Formula 1 wherein M is sodium).

The gums employed in all of the above examples had viscosities from 500,000 centistokes to 10,000,000 centistokes and molecular weights from 100,000 to 1,500,000.

Although the present invention has been described above in terms of curing silicone gums wherein the organic substituents are hydrocarbon groups, it should be recognized that the instant invention is equally applicable to curing silicone gums wherein the organic groups are hydrocarbon groups having substituent groups (e.g., cyano or halogen substituents). Thus suitable gums include those composed of groups represented by Formulae 5 and 6 wherein at least one group represented by R is a substituted monovalent hydrocarbon group (e.g., a cyano-substituted or a halogen-substituted monovalent hydrocarbon group). Such groups include the cyanoalkyl groups (e.g., the beta-cyanoethyl, gamma-cyanopropyl and delta-cyanobutyl groups), the cyano aryl groups (e.g., the meta-cyanophenyl and para-cyanophenyl groups), the haloalkyl groups (e.g., the trifluoropropyl, dichlorocyclohexyl and tetrafluoroethyl groups) and the haloaryl groups (e.g., the para-chlorophenyl group). By way of illustration, one useful gum is composed of methylvinylsiloxane groups, gamma-cyanopropylmethylsiloxane groups and dimethylsiloxane groups and another useful gum is composed of methylvinylsiloxane groups, beta-cyanoethylmethylsiloxane groups, tetrafluoroethylmethylsiloxane groups and dimethylsiloxane groups.

What is claimed is:

1. A curable silicone gum compound consisting essentially of: (1) a diorganopolysiloxane gum consisting essentially of from 0.05 part to 3.0 parts by weight per 100 parts by weight of the gum of groups having the formula:

 (1)

wherein R is a member selected from the group consisting of the unsubstituted monovalent hydrocarbon groups that are free of olefinic unsaturation, the cyano-substituted monovalent hydrocarbon groups that are free of olefinic unsaturation and the halogen-substituted monovalent hydrocarbon groups that are free of olefinic unsaturation and R' is a monovalent olefinically unsaturated hydrocarbon group and from 97.0 parts to 99.95 parts by weight per 100 parts by weight of the gum of groups having the formula:

 (2)

wherein R has the above-defined meaning and (2) a zeolitic molecular sieve which has an average pore size of at least 6.6 Angstroms and which contains in the adsorbed state an alkyl peroxide curing agent that is composed only of carbon hydrogen and oxygen, that is free of organofunctional groups other than from 1 to 2 peroxide groups and that contains from 4 to 20 carbon atoms per molecule, said curing agent being present in an amount of from 0.05 part to 10 parts by weight per 100 parts by weight of the gum.

2. The curable silicone gum compound of claim 1 wherein the curing agent is di-tertiary-butyl peroxide.

3. The curable silicone gum compound of claim 1 wherein the curing agent is dicumyl peroxide.

4. The curable silicone gum compound of claim 1 wherein R in Formula 1 is an ethyl group, R' in Formula 1 is a vinyl group and R in Formula 2 is a methyl group.

5. The curable silicone gum compound of claim 1 wherein the zeolitic molecular sieve is sodium zeolite X, said sodium zeolite X being a crystalline sodium-alumino-silicate having an arrangement of atoms such that the crystalline X-ray diffraction pattern is essentially the same as that tabulated in Table A.

6. The curable silicone gum compound of claim 1 wherein the zeolitic molecular sieve is zeolite L, said zeolite L being a crystalline metal-almino-silicate having an arrangement of atoms such that the crystalline X-ray diffraction pattern is essentially the same as that tabulated in Table B.

7. The curable silicone gum compound of claim 1 wherein the zeolitic molecular sieve is zeolite Y, said zeolite Y being a crystalline metal-alumino-silicate having an arrangement of atoms such that the crystalline X-ray diffraction pattern is essentially the same as that tabulated in Table C.

8. A curable silicone gum compound consisting essentially of: (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of di-tertiary-butyl peroxide.

9. A curable silicone gum compound consisting essentially of: (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of dicumyl peroxide.

10. A curable silicone gum compound consisting essentially of: (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) line sodium-alumino-silicate having an arrangement of sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of 2,5-dimethyl-2,5-di-(tertiary-butylperoxy) hexane.

11. A process for producing a curable silicone gum compound which comprises forming a mixture of (1) a diorganopolysiloxane gum consisting essentially of from 0.05 part to 3.0 parts by weight per 100 parts by weight of the gum of groups having the formula:

(1)

wherein R is a member selected from the group consisting of the unsubstituted monovalent hydrocarbon groups that are free of olefinic unsaturation, the cyano-substituted monovalent hydrocarbon groups that are free of olefinic unsaturation and the halogen-substituted monovalent hydrocarbon groups that are free of olefinic unsaturation and R' is a monovalent olefinically unsaturated hydrocarbon group and from 97.0 parts to 99.5 parts by weight per 100 parts by weight of the gum groups having the formula:

(2)

wherein R has the above-defined meaning and (2) a zeolitic molecular sieve which has an average pore size of at least 6.6 Angstroms and which contains in the adsorbed state an alkyl peroxide curing agent that is composed only of carbon hydrogen and oxygen, that is free of an organofunctional group other than from 1 to 2 peroxide groups and that contains from 4 to 20 carbon atoms per molecule, said curing agent being present in an amount of from 0.05 part to 10 parts by weight per 100 parts by weight of the gum.

12. The process of claim 11 where the curing agent is di-tertiary-butyl peroxide.

13. The process of claim 11 where the curing agent is dicumyl peroxide.

14. The process of claim 11 where R in Formula 1 is an ethyl group, R' in Formula 1 is a vinyl group and R in Formula 2 is a methyl group.

15. The process of claim 11 where the zeolitic molecular sieve is sodium zeolite X, said sodium zeolite X being a crystalline sodium-alumino-silicate having an arrangement of atoms such that the crystalline X-ray diffraction pattern is essentially the same as that tabulated in Table A.

16. The process of claim 11 where the zeolitic molecular sieve is zeolite L, said zeolite L being a crystalline metal-alumino-silicate having an arrangement of atoms such that the crystalline X-ray diffraction pattern is essentially the same as that tabulated in Table B.

17. The process of claim 11 where the zeolitic molecular sieve is zeolite Y, said zeolite Y being a crystalline metal-alumino-silicate having an arrangement of atoms such that the crystalline X-ray diffraction pattern is essentially the same as that tabulated in Table C.

18. A process for producing a curable silicone gum compound which comprises forming a mixture of: (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of di-tertiary-butyl peroxide.

19. A process for producing a curable silicone gum compound which comprises forming a mixture of: (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of dicumyl peroxide.

20. A process for producing a curable silicone gum compound which comprises forming a mixture of (1) a diorganopolysiloxane gum consisting essentially of from 0.1 part to 0.4 part by weight per 100 parts by weight of the gum of ethylvinylsiloxane units and from 99.6 parts to 99.9 parts by weight per 100 parts by weight of the gum of dimethylsiloxane groups and (2) sodium zeolite X, said sodium zeolite X being a crystalline sodium-alumino-silicate having an arrangement of atoms such that the crystalline X-ray diffraction pattern is essentially the same as that tabulated in Table A and said sodium zeolite X containing in the absorbed state from 0.2 part to 2.0 parts by weight per 100 parts by weight of the gum of 2,5-dimethyl-2,5-di(tertiary-butylperoxy) hexane.

21. A process for producing a silicone elastomer which process comprises heating the curable silicone gum compound of claim 1 to release the curing agent from the zeolitic molecular sieve and to cause the curing agent so released to effect the cure of the gum compound to produce a silicone elastomer.

References Cited by the Examiner

UNITED STATES PATENTS

| | | | |
|---|---|---|---|
| 2,833,742 | 5/1958 | Koch | 260—46.5 |
| 2,842,520 | 7/1958 | Polmanteer et al. | 260—46.5 |
| 2,843,555 | 7/1958 | Berridge | 260—46.5 |
| 3,036,980 | 5/1962 | Dunham et al. | 252—455 |

OTHER REFERENCES

Hercules Technical Data Sheet No. 2-1-54.

Barrer, Quarterly Reviews, 1949, vol. III, No. 4, pp. 298–309.

Lange's Handbook of Chemistry, 6th Edition, 1946, pp. 374–375, published by Handbook Publishers, Inc., Sandusky, Ohio.

Hackh's Chemical Dictionary, 3rd Edition, 1944, page 772, published by McGraw-Hill Book Co., New York.

LEON J. BERCOVITZ, *Primary Examiner.*

HAROLD N. BURSTEIN, WILLIAM H. SHORT,
*Examiners.*

UNITED STATES PATENT OFFICE
CERTIFICATE OF CORRECTION

Patent No. 3,236,806  February 22, 1966

Milton L. Dunham, Jr.

It is hereby certified that error appears in the above numbered patent requiring correction and that the said Letters Patent should read as corrected below.

Column 16, lines 3 to 7, the formula should appear as shown below instead of as in the patent:

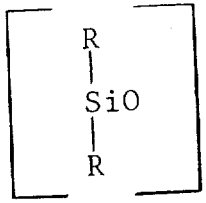

column 17, line 25, for "99.5" read -- 99.95 --.

Signed and sealed this 1st day of August 1967.

(SEAL)
Attest:

EDWARD M. FLETCHER, JR.
Attesting Officer

EDWARD J. BRENNER
Commissioner of Patents